April 5, 1960 G. DONCESE ET AL 2,931,946

POWER SUPPLY FOR ELECTRONIC EQUIPMENT

Filed Feb. 19, 1959

United States Patent Office 2,931,946

Patented Apr. 5, 1960

2,931,946

POWER SUPPLY FOR ELECTRONIC EQUIPMENT

George Doncese, Glen Cove, and Richard J. Farber, New Hyde Park, N.Y., assignors to Hazeltine Research, Inc., Chicago, Ill., a corporation of Illinois Application February 19, 1959, Serial No. 794,374

6 Claims. (Cl. 315—96)

This invention relates to a power supply for electronic equipment. While the invention will be described in the environment of a television receiver, it will be apparent to those skilled in the art that the invention has application in a number of other types of electronic equipment.

Most commercial television receivers which are built in the United States are designed to be used with a 110-volt supply. However, a number of European countries have a 220-volt supply. Therefore, if a domestic television receiver is to be used in such a locale, it is necessary to modify the power supply of the television receiver. At present it is a common practice to use an expensive step-down transformer in the primary power line. The present invention describes a simple and inexpensive way to modify the basic domestic television receiver so that it may be used with a 220-volt supply.

It is an object of the present invention to provide a new and improved power supply for electronic equipment.

It is another object of the present invention to provide a new and improved power supply for electronic equipment requiring a minimum number of additional circuit components.

It is a further object of the present invention to provide a new and improved power supply for electronic equipment requiring the addition of only low cost components.

It is a still further object of the present invention to provide a new and improved power supply for a television receiver requiring a minimum number of additional low cost circuit components.

In accordance with a particular form of the present invention a power supply for electronic equipment comprises first circuit means for supplying an input voltage. The invention also includes second circuit means responsive to the input voltage for developing a supply voltage and a bleeder circuit connected in parallel with the second circuit means. The invention finally includes a plurality of series-connected filament sources connected in series with the parallel combination of the second circuit means and the bleeder circuit.

For a better understanding of the present invention, together with other and further objects thereof, reference is had to the following description, taken in connection with the accompanying drawing, and its scope will be pointed out in the appended claims.

Referring to the drawings.

Figure 1:
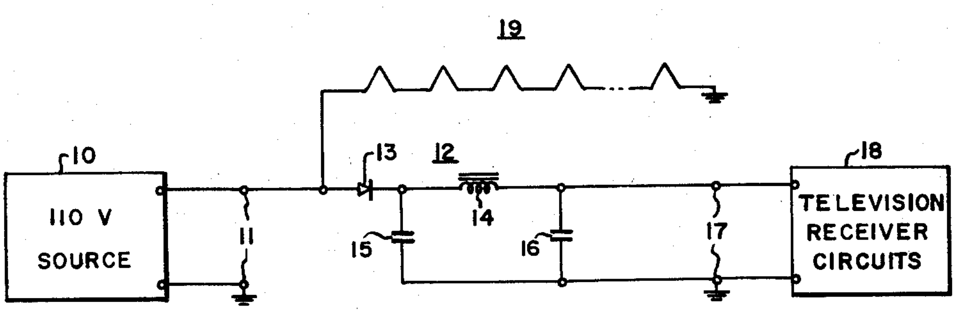
Fig. 1 shows a conventional power supply of a domestic television receiver.

*Description and operation of Fig. 1 power supply*

A first circuit means 10 supplies a 110-volt input voltage to terminals 11. A second circuit means 12, connected to upper terminal 11, is responsive to the input voltage and develops a D.C. supply voltage. Circuit means 12 may be composed of a rectifier 13, inductor 14, and condensers 15 and 16. The D.C. supply voltage developed by the circuit means 12 is supplied through a pair of terminals 17 to the remaining television receiver circuits 18 such as the video, audio, and synchronizing circuits.

A plurality of series-connected filament sources 19, connected to upper terminal 11, are a portion of the remaining television receiver circuits 18.

Examination of Fig. 1 shows that the circuit means 12 and the plurality of series-connected filament sources 19 are connected in parallel across the terminals 11. Normally the voltage at terminals 17 is in the order of 140 volts D.C., and the current flowing through these terminals is in the order of 250 milliamperes. The series-connected filament sources normally draw about 600 milliamperes. If the television receiver circuits 18 are to be used with a 220-volt input voltage, it becomes necessary to modify the power supply of Fig. 1.

Figure 2:
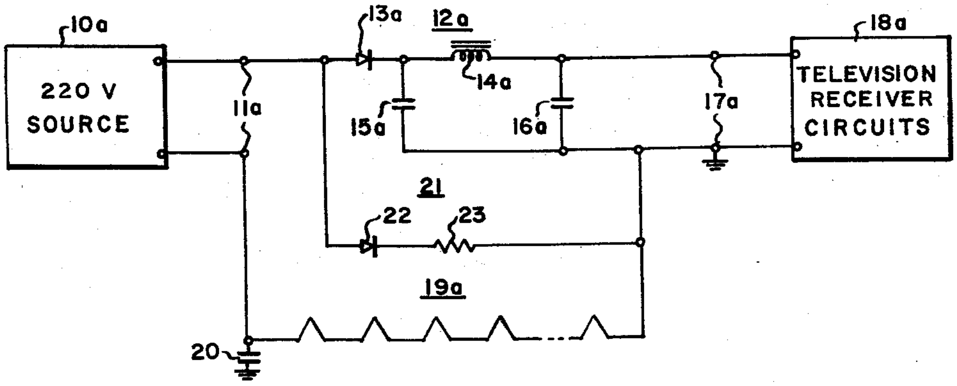
Fig. 2 shows a circuit diagram in accordance with a particular form of the present invention.

*Description of Fig. 2 power supply*

Fig. 2 shows a circuit diagram in accordance with a particular form of the present invention. Elements in Fig. 2 corresponding to elements in Fig. 1 have been given the same reference numerals followed by suffixes. A first circuit means 10a supplies a 220-volt input voltage to terminals 11a. A second circuit means 12a is connected to upper terminal 11a. Circuit means 12a may be composed of a rectifier 13a, inductor 14a and condensers 15a and 16a. This circuit means is connected through a pair of terminals 17a to the remaining television receiver circuits 18a. A plurality of series-connected filament sources 19a are connected to lower terminal 11a. Condenser 20 is connected between lower terminal 11a and ground. A bleeder circuit 21 comprising a rectifier 22 and a resistor 23 is connected in parallel with the circuit means 12a. Examination of Fig. 2 shows that the plurality of series-connected filament sources are connected in series with the parallel combination of circuit means 12a and the bleeder circuit 21.

*Operation of Fig. 2 power supply*

Circuit means 10a supplies a 220-volt input voltage to terminals 11a. The second circuit means 12a, connected to upper terminal 11a, is responsive to the input voltage and develops a D.C. supply voltage which is supplied through a pair of terminals 17a to the remaining television receiver circuits 18a. The bleeder circuit 21, connected in parallel with the circuit means 12a, is also responsive to the input voltage. The plurality of series-connected filament sources 19a, connected to the lower input terminal 11a, is a portion of the remaining television receiver circuits.

As previously stated, the current drawn by the series-connected filament sources 19a is in the order of 600 milliamperes, while the current drawn by the television receiver circuits 18a is in the order of 250 milliamperes. Therefore, the difference in current is provided by the bleeder circuit 21. The series-connected filament sources 19a serve as a return path for the current that flows through the bleeder circuit 21 and the circuit means 12a.

Comparing Figs. 1 and 2, the only additional components in Fig. 2 are condenser 20, rectifier 22, and resistor 23. Rectifier 22 serves two purposes. If resistor 23 were connected directly to upper terminal 11a, a voltage of approximately 150 volts would be applied across it, and a current of approximately 350 milliamperes would flow through it. The power dissipated in the resistor 23 would, under such conditions, be appreciable. A great deal of power would therefore be dissipated. By placing a half-wave rectifier 22 in the bleeder circuit 21 the average voltage across resistor 23 is reduced to approximately 40 or 50 volts, and the added power is therefore reduced by approximately a factor of three. The second purpose of rectifier 22 is to provide a D.C. voltage for the filaments when the primary power line frequency is other than 60 cycles. If the frequency of the primary power line is 50 cycles, which is quite common for some European countries, the picture of the television receiver will flicker. It is for this reason that the filaments are supplied with D.C. voltage.

It is apparent that the arrangement of Fig. 2 is far less expensive than the arrangements presently being used, namely step-down transformers. Since the rectifier 22 is necessary in many locales where 50-cycle frequencies are used in the primary power line, the only additional components are condenser 20 and resistor 23.

While applicant has made reference to particular values of currents and voltages, it will be obvious that the present invention is not limited to such values. It will also be obvious to those skilled in the art that various changes and modifications may be made therein without departing from the invention and it is, therefore, aimed to cover all such changes and modifications as fall within the true spirit and scope of the invention.

What is claimed is:

1. A power supply for electronic equipment comprising: first circuit means for supplying an input voltage; second circuit means responsive to said input voltage for developing a supply voltage; a bleeder circuit connected in parallel with said second circuit means; and a plurality of series-connected filament sources connected in series with the parallel combination of said second circuit means and said bleeder circuit.

2. A power supply for electronic equipment comprising: first circuit means having a pair of terminals for supplying an input voltage; second circuit means, connected to one of said terminals, responsive to said input voltage for developing a supply voltage; a bleeder circuit connected in parallel with said second circuit means; and a plurality of series-connected filament sources connected to the other terminal and in series with the parallel combination of said second circuit means and said bleeder circuit.

3. A power supply for electronic equipment comprising: first circuit means for supplying an A.C. input voltage; second circuit means responsive to said A.C. input voltage for developing a D.C. supply voltage; a bleeder circuit connected in parallel with said second circuit means; and a plurality of series-connected filament sources connected in series with the parallel combination of said second circuit means and said bleeder circuit.

4. A power supply for electronic equipment comprising: first circuit means having a pair of terminals for supplying an A.C. input voltage; second circuit means, connected to one of said terminals, responsive to said A.C. input voltage for developing a D.C. supply voltage; a bleeder circuit connected in parallel with said second circuit means; and a plurality of series-connected filament sources connected to the other terminal and in series with the parallel combination of said second circuit means and said bleeder circuit.

5. A power supply for a television receiver comprising: first circuit means having a pair of terminals for supplying an A.C. input voltage; second circuit means, connected to one of said terminals, responsive to said A.C. input voltage, for developing a D.C. supply voltage for the television receiver circuits; a bleeder circuit connected in parallel with said second circuit means; and a plurality of series-connected filament sources connected to the other terminal and in series with the parallel combination of said second circuit means and said bleeder circuit.

6. A power supply for electronic equipment comprising: first circuit means for supplying an input voltage; second circuit means responsive to said input voltage for developing a supply voltage; a bleeder circuit, including a serially connected rectifier and resistor, connected in parallel with said second circuit means; and a plurality of series-connected filament sources connected in series with the parallel combination of said second circuit means and said bleeder circuit.

References Cited in the file of this patent

UNITED STATES PATENTS

| | | |
|---|---|---|
| 1,982,777 | Aceves | Dec. 4, 1934 |
| 2,220,051 | Israel et al. | Oct. 29, 1940 |
| 2,261,203 | Albright | Nov. 4, 1941 |